(12) United States Patent
Carns et al.

(10) Patent No.: US 9,695,734 B2
(45) Date of Patent: Jul. 4, 2017

(54) INTERNAL COMBUSTION ENGINE FLUID-METERING VALVE ASSEMBLY

(71) Applicant: ILLINOIS TOOL WORKS INC., Glenview, IL (US)

(72) Inventors: Christopher A. Carns, Hicksville, OH (US); Rohan R. Sawai, Bryan, OH (US)

(73) Assignee: Illinois Tool Works Inc, Glenview, IL (US)

( * ) Notice: Subject to any disclaimer, the term of this patent is extended or adjusted under 35 U.S.C. 154(b) by 69 days.

(21) Appl. No.: 14/766,556

(22) PCT Filed: Feb. 10, 2014

(86) PCT No.: PCT/US2014/015546
§ 371 (c)(1),
(2) Date: Aug. 7, 2015

(87) PCT Pub. No.: WO2014/130280
PCT Pub. Date: Aug. 28, 2014

(65) Prior Publication Data
US 2016/0003126 A1    Jan. 7, 2016

Related U.S. Application Data

(60) Provisional application No. 61/766,406, filed on Feb. 19, 2013.

(51) Int. Cl.
*F01P 5/10*    (2006.01)
*F01P 7/14*    (2006.01)
*F16K 5/12*    (2006.01)
*F16K 5/06*    (2006.01)
*F16K 5/20*    (2006.01)
(Continued)

(52) U.S. Cl.
CPC  *F01P 7/14* (2013.01); *F01P 3/20* (2013.01); *F16K 5/0605* (2013.01); *F16K 5/12* (2013.01);
(Continued)

(58) Field of Classification Search
CPC ...... F01P 5/10; F01P 5/12; F01P 7/164; F01P 2005/125; F01P 2007/146; F02B 75/22
(Continued)

(56) References Cited

U.S. PATENT DOCUMENTS 5,601,651 A    2/1997  Watabe
5,680,889 A    10/1997 Boger
(Continued)

FOREIGN PATENT DOCUMENTS

CN    2186336    12/1994
CN    1594843    3/2005
(Continued)

OTHER PUBLICATIONS

ISR and WO for PCT/US2014/015546 mailed May 26, 2014.

*Primary Examiner* — Jacob Amick
*Assistant Examiner* — Charles Brauch
(74) *Attorney, Agent, or Firm* — Joseph M. Butscher; The Small Patent Law Group LLC

(57) ABSTRACT

A fluid-metering valve assembly for use in a coolant regulator of an internal combustion engine cooling system may include a main body and a metering member. The main body is configured to be rotatably secured within an internal chamber of the coolant regulator. A fluid passage is formed through the main body, and is defined, at least in part, by a metering edge of the main body. The metering member is formed proximate to the metering edge of the main body, and is configured to allow variable doses of fluid to be metered into or out of the coolant regulator as the main body is rotated within the coolant regulator. The metering member includes one or more linear features formed into the main body.

16 Claims, 6 Drawing Sheets

(51) Int. Cl.
*F16K 11/16* (2006.01)
*F01P 3/20* (2006.01)
*F16K 11/087* (2006.01)
*F01P 7/16* (2006.01)
*F01P 5/12* (2006.01)
*F02B 75/22* (2006.01)

(52) U.S. Cl.
CPC ............ *F16K 5/20* (2013.01); *F16K 11/0876* (2013.01); *F16K 11/165* (2013.01); *F01P 5/10* (2013.01); *F01P 5/12* (2013.01); *F01P 7/164* (2013.01); *F01P 2005/125* (2013.01); *F01P 2007/146* (2013.01); *F02B 75/22* (2013.01)

(58) Field of Classification Search
USPC ...................................................... 123/41.44
See application file for complete search history.

(56) References Cited

U.S. PATENT DOCUMENTS

2003/0102036 A1  6/2003  Sosa
2011/0247575 A1  10/2011 Heldberg

FOREIGN PATENT DOCUMENTS

| DE | 3142964 A1 | 5/1983 | |
|---|---|---|---|
| EP | 0688986 A1 | 12/1995 | |
| EP | 1529937 A1 | 5/2005 | |
| GB | 1368355 A | 9/1974 | |
| GB | 2309797 A | 8/1997 | |
| JP | GB 2309797 A * | 8/1997 | ......... B60H 1/00485 |
| WO | 2010061343 A1 | 6/2010 | |

* cited by examiner

US 9,695,734 B2

INTERNAL COMBUSTION ENGINE FLUID-METERING VALVE ASSEMBLY

RELATED APPLICATIONS

This application is a National Phase of PCT/US2014/015546 filed Feb. 10, 2014 and relates to and claims priority benefits from U.S. Provisional Patent Application No. 61/766,406 filed Feb. 19, 2013, which is hereby incorporated by reference in its entirety.

FIELD OF EMBODIMENTS OF THE DISCLOSURE

Embodiments of the present disclosure generally relate to a cooling system for an internal combustion engine, and, more particularly, to a fluid-metering valve assembly configured for use in a cooling system of an internal combustion engine.

BACKGROUND

A typical internal combustion engine includes a main cooling circuit configured to allow coolant, such as water, to flow through a radiator. A bypass conduit opens during a start phase of the engine and allows the coolant to circulate through the bypass conduit. In general, a thermostatic valve system controls the flow of coolant. At least one valve is driven by a thermally expansive member and fit with a bypass valve. The valves are connected to each other such that, at a predefined lower temperature, the thermostatic valve is closed and the bypass valve is open. As the temperature increases, the thermostatic valve opens, and the bypass valve gradually closes. WO2010/061343, entitled "A Cooling System For A Combustion Engine," which is hereby incorporated by reference in its entirety, provides further details of a cooling system.

Certain valves may include a metering feature that allows smaller amounts of fluid to be metered therethrough. However, many of the metering features are sized and shaped so as to allow too much fluid to pass therethrough. In short, the metering features may be too large to allow for smaller or finer-tuned amounts of fluid to pass therethrough. Further, known metering features may be formed with complex shapes and boundaries, which may add time and cost to manufacturing.

SUMMARY OF EMBODIMENTS OF THE DISCLOSURE

Certain embodiments of the present disclosure provide a fluid-metering valve assembly configured for use in a coolant regulator of an internal combustion engine cooling system. The assembly may include a main body configured to be rotatably secured within an internal chamber of the coolant regulator. A fluid passage may be formed through the main body. The fluid passage may be defined, at least in part, by a metering edge of the main body. The assembly may also include a metering member formed proximate to the metering edge of the main body. The metering member is configured to allow variable doses of fluid to be metered into or out of the coolant regulator as the main body is rotated within the coolant regulator. The metering member may include one or more linear features formed into the main body (in contrast to complex features that are formed through complex cutting operations, for example). In at least one embodiment, the metering member is formed at the metering edge. In at least one other embodiment, the metering member is offset from the metering edge.

The metering member may include a fluid inlet connected to a constricting fluid outlet. The fluid inlet may include a fluid inlet opening defined between linear side walls and a perpendicular base. The linear side walls may connect to linear barrier inlet walls that are parallel to the metering edge. The linear barrier inlet walls may connect to linear angled outlet walls of the constricting fluid outlet. The linear angled outlet walls may converge toward a linear barrier outlet wall that is parallel with the metering edge. The metering member may be T-shaped.

In at least one embodiment, the metering member slopes from a fluid inlet to a fluid outlet. A first depth of the metering member at the fluid inlet may be greater than a second depth of the metering member at the fluid outlet.

In at least one embodiment, the metering member may include angled side walls that converge at a fluid outlet apex. The metering member may form a semi-funnel.

In at least one embodiment, the metering member may include a fluid inlet that connects to a fluid outlet having the same width as the fluid inlet.

The metering edge may be curved. At least one wall portion of the metering member may be parallel to the curved metering edge.

The metering member may include only the one or more linear features formed into the main body. The linear features may be simple, geometric shapes that are easily formed through stamping, indentation, and the like.

Certain embodiments of the present disclosure provide an internal combustion engine cooling system that may include a coolant regulator having an internal chamber, an actuator, and a fluid-metering valve assembly rotatably secured within the internal chamber and operatively connected to the actuator. The actuator is configured to rotate the fluid metering valve assembly within the internal chamber. The fluid-metering valve assembly may include a main body rotatably secured within the internal chamber and having a drive shaft operatively connected to the actuator. A fluid passage is formed through the main body. The fluid passage is defined, at least in part, by a metering edge of the main body. The fluid-metering valve assembly may also include a metering member formed proximate to the metering edge of the main body. The metering member is configured to allow variable doses of fluid to be metered into or out of the coolant regulator as the main body is rotated within the coolant regulator. The metering member may include one or more linear features formed into the main body.

Figure 1:
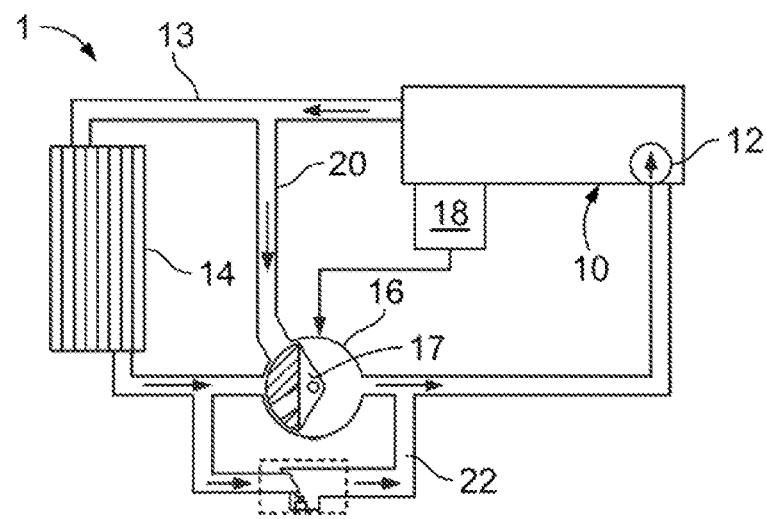
FIG. 1 illustrates a schematic diagram of an internal combustion engine cooling system, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide fluid-metering valve assemblies configured to provide increased temperature control of an internal combustion engine cooling system. Embodiments of the present disclosure provide fluid-metering valve assemblies configured to allow small, fine-tuned doses of cold coolant to be metered into the cooling system through small rotations of the assembly.

FIG. 1 illustrates a schematic diagram of an internal combustion engine cooling system 1, according to an embodiment of the present disclosure. The system 1 includes an internal combustion engine 10 that is operatively connected to a coolant pump 12, such as a water pump. A cooling circuit 13 includes a radiator 14, which is in fluid communication with a coolant regulator 16. A regulating element, such as a fluid-metering valve assembly 17, is rotatably secured within the coolant regulator 16, and may be actuated by a drive, such as a worm drive or the like. An engine control 18 operatively controls the drive. The engine control 18 detects particular engine states, temperatures within the system, and the like. The cooling circuit 13 may be shunted by a bypass 20, which is also in fluid communication with the coolant regulator 16. The coolant initially circulates by way of the coolant regulator 16 through the bypass 20 so that the internal combustion engine 10 reaches operational temperature as soon as possible. The bypass 20 is blocked only after the coolant reaches a predefined temperature.

The coolant regulator 16 is configured to completely interrupt the flow of coolant. The interruption may be carried out in a cold start phase so that the internal combustion engine 10 may be heated relatively quickly. If, however, the cold start phase does not take place, the internal combustion engine 10 may overheat. To avoid overheating, a subsidiary branch 22 is configured to shunt coolant away from the coolant regulator 16.

The fluid-metering valve assembly 17 within the coolant regulator 16 may include a ball or spherical-shaped main body that is actuated by a direct current motor, for example. The main body may include one or more channels or openings that are configured to be rotated into and out of alignment with conduits, in order to selectively prevent and allow fluid to flow therethrough. As such, the main body is configured to selectively open and close various flow paths at certain angles of rotation.

During operation of the internal combustion engine 10, the flow path of the radiator 14 is opened to allow for cold coolant flow from the radiator 14 into the hot coolant flow path. As such, the hot and cold coolant mix, thereby allowing the temperature of the system to be controlled.

Figure 2:
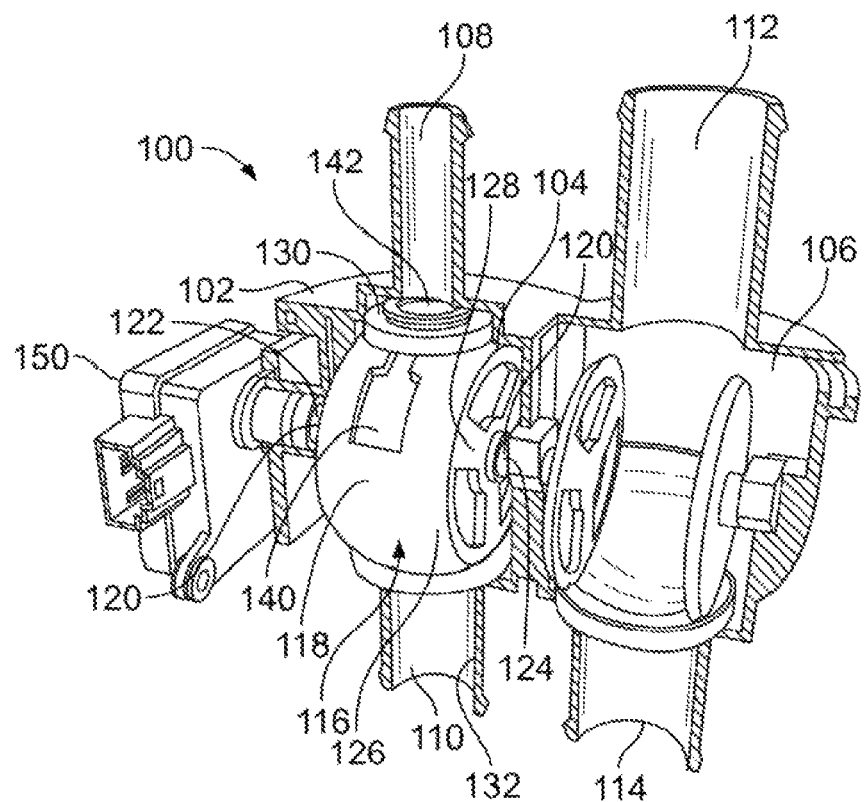
FIG. 2 illustrates a perspective internal view of a coolant regulator, according to an embodiment of the present disclosure.

FIG. 2 illustrates a perspective internal view of a coolant regulator 100, according to an embodiment of the present disclosure. The coolant regulator 100 includes a housing 102 defining internal chambers 104 and 106. The internal chamber 104 is in communication with a fluid inlet conduit 108 and a fluid outlet conduit 110. Similarly, the internal chamber 106 is in communication with a fluid inlet conduit 112 and a fluid outlet conduit 114. Alternatively, the fluid inlet conduits 108, 112 and the fluid outlet conduits 110 and 114 may be reversed, such that the conduits 108 and 112 are fluid outlet conduits, and the conduits 110 and 114 are fluid inlet conduits. Additionally, the coolant regulator 100 may include more or less internal chambers 104 and 106 than shown. For example, the coolant regulator 100 may include only a single internal chamber, or may include three or more internal chambers that are in fluid communication with fluid inlet and outlet conduits.

A fluid-metering valve assembly 116 may be rotatably secured within the internal chamber 104. The fluid metering valve assembly 116 includes a semi-spherical or ball shaped main body 118 configured to be rotatably secured within a reciprocally-shaped area of the internal chamber 104. The main body 118 includes an axial drive shaft 120 extending from an axial center at one or both ends 122 and 124. The main body 118 also includes an outer circumferential wall 126 that may connect to the drive shafts 120 through radial beams 128, such as spokes, that may connect to the drive shafts 120 or hubs surrounding the drive shafts 120.

Sealing members 130 and 132, such as gaskets, annular disks, or the like, are positioned at the union of the internal chamber 104 and the fluid conduit 108 and the fluid conduit 110, respectively. The outer circumferential wall 126 of the fluid-metering valve assembly 116 seats against both sealing members 130. As shown in FIG. 2, one or more channels 140 are formed through the outer circumferential wall 126. When a channel 140 is positioned in alignment within an opening 142 in the sealing member 130, for example, fluid may pass from the fluid inlet conduit 108, through the channel 140, and into the internal chamber 104. When the channel 140 is positioned out of alignment with the opening 142 such that only a solid wall portion of the outer circumferential wall 126 abuts into the sealing member 130, fluid is prevented from passing into the internal chamber 104.

The drive shaft 120 is operatively connected to an actuator 150, such as a direct current motor. The actuator 150 is configured to rotate the drive shaft 120, and therefore the entire fluid-metering valve assembly 116 between open and closed positions. In the open position, fluid passes through the channel 140 into the internal chamber 104. In the closed position, fluid is prevented from passing into the internal chamber 104.

Figure 3:
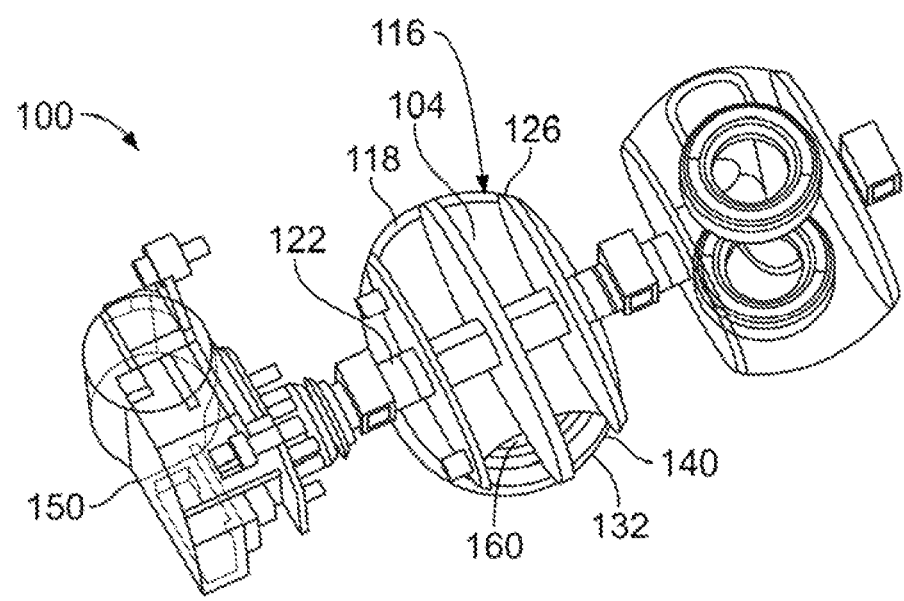
FIG. 3 illustrates a top internal view of a coolant regulator in which a fluid-metering valve assembly is in a rotated position, according to an embodiment of the present disclosure.

FIG. 3 illustrates a top internal view of a coolant regulator 100 in which the fluid-metering valve assembly 116 is in a rotated open position, according to an embodiment of the present disclosure. As shown in FIG. 3, the actuator 150 has rotated the fluid-metering valve assembly 116 so that a channel 140 formed through the outer circumferential wall 126 is at least partially aligned with an opening 160 formed through the sealing member 132. As such, fluid may pass from the internal chamber 104 into the fluid conduit 110 (shown in FIG. 1), or vice versa, through the opening 160.

Figure 4:
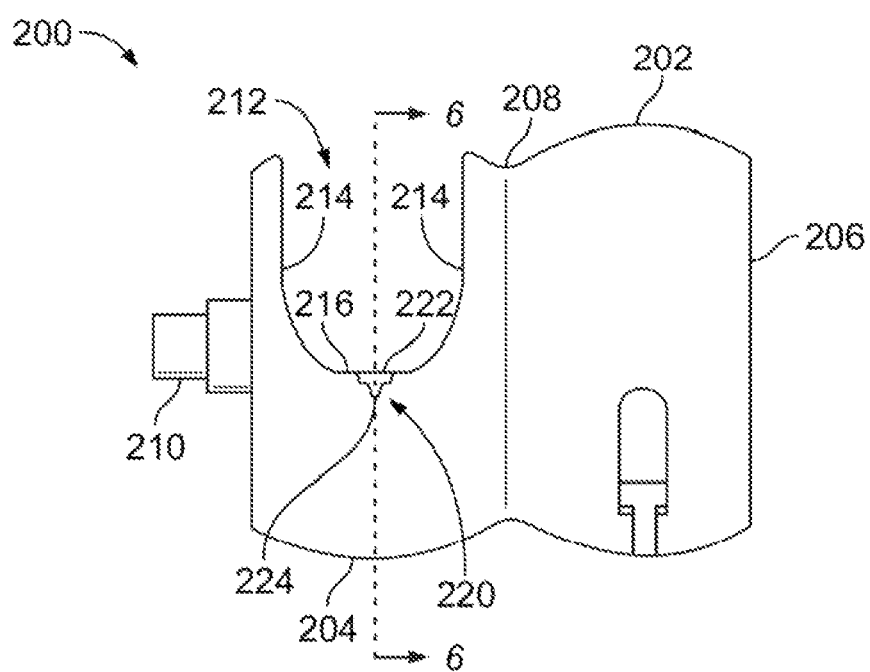
FIG. 4 illustrates a lateral view of a fluid-metering valve assembly, according to an embodiment of the present disclosure.

FIG. 4 illustrates a lateral view of a fluid-metering valve assembly 200, according to an embodiment of the present disclosure. The fluid-metering valve assembly 200 is configured to be rotatably secured within a coolant regulator, such as described above. The fluid-metering valve assembly 200 may be formed of plastic, metal, or the like. In at least one embodiment, the fluid-metering valve assembly 200 may be integrally molded and formed as a single piece of material.

The fluid-metering valve assembly 200 includes a main body 202 including a first circumferential wall 204 connected to a second circumferential wall 206. Each circumferential wall 204 and 206 may include solid wall portions that may be formed having an outer curvature that may be semi-spherical or semi-ball shaped. While two circumferential walls 204 and 206 are shown, the fluid-metering valve assembly 200 may alternatively include only a single circumferential wall 204. Also, alternatively, the fluid-metering valve assembly 200 may include more than the two circumferential walls 204 and 206.

The circumferential walls 204 and 206 may be joined at a seam 208. Each circumferential wall 204 and 206 may be configured to be rotatably secured within a respective internal chamber of a coolant regulator, for example.

The circumferential wall 204 may connect to a drive shaft 210 through radial beams or extension portions (hidden from view in FIG. 4). The circumferential wall 206 may be similarly connected to a drive shaft.

A fluid passage channel 212 is formed through the circumferential wall 204. The circumferential wall 204 includes internal circumferential edge portions 214 that connect to a perpendicular metering edge 216. The fluid passage channel 212 is defined by the internal circumferential edge portions 214 and the metering edge 216.

Figure 5:
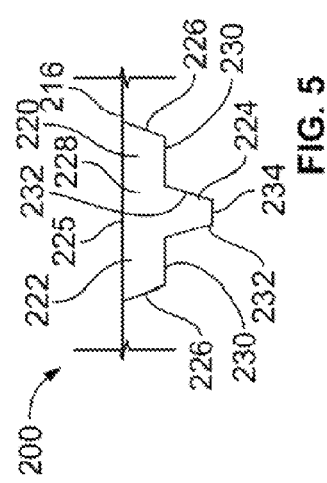
FIG. 5 illustrates a front view of a metering member formed at a metering edge of a fluid-metering valve assembly, according to an embodiment of the present disclosure.

FIG. 5 illustrates a front view of a metering member 220 formed at the metering edge 216 of the fluid-metering valve assembly 200, according to an embodiment of the present disclosure. Referring to FIGS. 4 and 5, the metering member 220 may be a recessed are formed within the circumferential wall 204 that is centered with respect to the metering edge 216. As such, the metering member 220 may not include an opening, channel, or perforation that passes entirely through or perforates the metering edge 216. Instead, the metering member 220 may be formed through a stamping or indentation process that provides a reduced thickness or recessed area at or proximate to the metering edge 216.

The metering member 220 includes a fluid inlet 222 connected to a constricting fluid outlet 224. The fluid inlet 222 may include a fluid inlet opening 225 defined between linear inlet side walls 226 and a perpendicular base 228. The inlet side walls 226 connect to linear barrier inlet walls 230 that may be parallel with the metering edge 216. The barrier inlet walls 230, in turn, connect to linear angled outlet walls 232 of the constricting fluid outlet 224. The angled outlet walls 232 may be parallel with the inlet side walls 226 of the fluid inlet 222. While shown as angled, both the angled outlet walls 232 and the inlet side walls 226 may alternatively be perpendicular to the barrier inlet walls 230.

The linear angled outlet walls 232 of the constricting fluid outlet 224, in turn, converge toward one another and connect to a linear barrier outlet wall 234 that may be parallel with the barrier inlet walls 230. As such, the metering member 220 may resemble a T-shape, having straight, linear wall portions around the perpendicular base 228. The perpendicular base 228 may slope up from the metering edge 216 toward the linear barrier outlet wall 234. Alternatively, instead of connecting to the linear barrier outlet wall 234, the linear angled outlet walls 232 may converge together at an apex or point.

Figure 6:
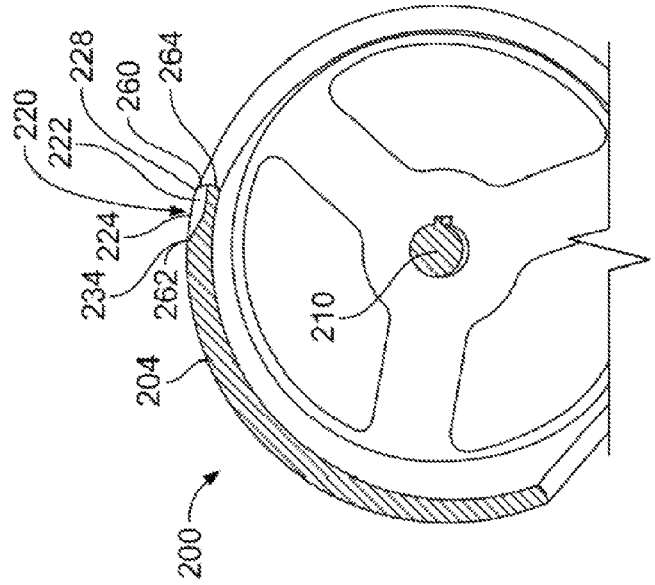
FIG. 6 illustrates a cross-sectional view of a fluid-metering valve assembly through line 6-6 of FIG. 4, according to an embodiment of the present disclosure.

FIG. 6 illustrates a cross-sectional view of the fluid-metering valve assembly 200 through line 6-6 of FIG. 4, according to an embodiment of the present disclosure. As shown, the fluid inlet 222 includes a deep opening 260 with respect to the base 228. However, the base 228 slopes upward toward the barrier outlet wall 234. As such, the height 262 of the metering member 220 proximate to the barrier outlet wall 234 may be less than the height 264 proximate to the opening 260. The base 228 may gradually and progressively slope upwardly from the fluid inlet 222 to the barrier outlet wall 234. The slope may be constant from the fluid inlet 222 to the barrier outlet wall 234. The gradual slope of the base 228 allows for increased fluid flow as the metering member 220 is rotated into alignment with a fluid passage. For example, if only the barrier outlet wall 234 is in fluid communication with the fluid passage, only a small portion of fluid may pass into the fluid passage, as the metering member 220 is shallow (and thin, in terms of width) proximate to the barrier outlet wall 234. However, when the fluid inlet 222 is aligned with the fluid passage, a greater volume of fluid may pass into the fluid passage due to the deep (and wide) nature of the metering member 220 proximate to the fluid inlet 222.

Optionally, the base 228 within the fluid inlet 222 may be or include a relatively flat, non-sloped portion, and the base 228 may slope upwardly within the constricting fluid outlet 224. Alternatively, the base 228 may not slope, but may instead have a uniform height throughout the metering member 220.

As shown, the metering member 220 may be formed as an indentation in an outer surface of the fluid-metering valve assembly 200. Each portion of the metering member 220 may be cut into an outer surface of the fluid-metering valve assembly 200 and/or tapered, beveled, or otherwise angled to provide increased fluid control.

It is to be understood that when the constricting fluid outlet 224 is in fluid communication with an opening in a sealing member of a coolant regulator, for example, but the fluid inlet 222 is not in fluid communication therewith, fluid may enter the fluid inlet 222, pass through the metering member 220 and be metered out of the constricting fluid outlet 224 into the opening of the sealing member. However, when the fluid inlet 222 is in fluid communication with the opening, fluid passes into the metering member 220 through the fluid inlet 222 and passes out into the opening through the fluid inlet 222.

While the metering member 220 is described with respect to the circumferential wall 204, it is to be understood that the circumferential wall 206 may also include a metering member. Alternatively, the circumferential wall 206 may not include a metering member. Further, as described above, the fluid-metering valve assembly 200 may include only one circumferential wall 204 having the metering member 220 formed therethrough. Alternatively, the fluid-metering valve assembly 200 may include more than two circumferential walls, each of which may or may not include a metering member.

Figure 8:
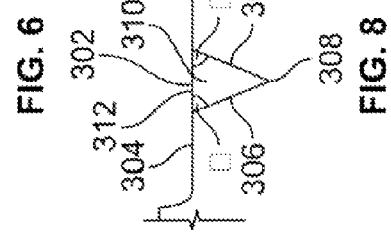
FIG. 8 illustrates a front view of a metering member formed at a metering edge of a fluid-metering valve assembly, according to an embodiment of the present disclosure.
Figure 7:
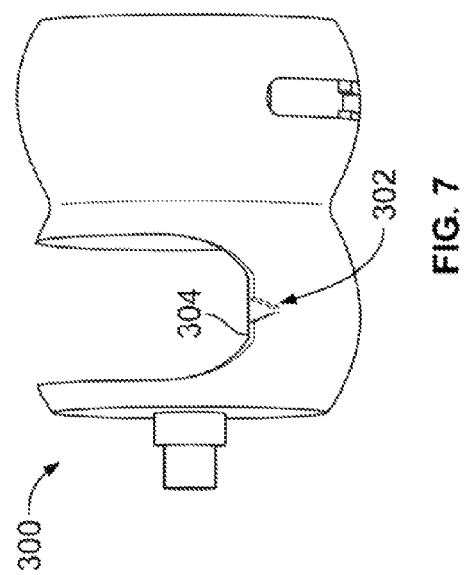
FIG. 7 illustrates a lateral view of a fluid-metering valve assembly, according to an embodiment of the present disclosure.

FIG. 7 illustrates a lateral view of a fluid-metering valve assembly 300, according to an embodiment of the present disclosure. FIG. 8 illustrates a front view of a metering member 302 formed at a metering edge 304 of the fluid-metering valve assembly 300. Referring to FIGS. 7 and 8, the fluid-metering valve assembly 300 is similar to the fluid-metering assembly 200, except that the metering member 302 is defined by straight, linear side walls 306 that converge at a fluid outlet apex 308. As such, the metering member 302 may have a V-shape. Each side wall 306 may be set at an angle θ with respect to the metering edge 304. The angle θ may be between 30°-45°, for example. Alternatively, the angle θ may be greater or less than 30°-45°. The metering member 302 is defined between the side walls 306 and a base 310. The base 310 may slope upwardly from a fluid inlet 312 to the fluid outlet apex 308, similar to as described above. As such, the metering member 302 may form a semi-funnel in which the fluid inlet 312 has a height and radius that exceeds those of the fluid outlet apex 308. Alternatively, the base 310 may have a uniform height and radius throughout.

Figure 9:
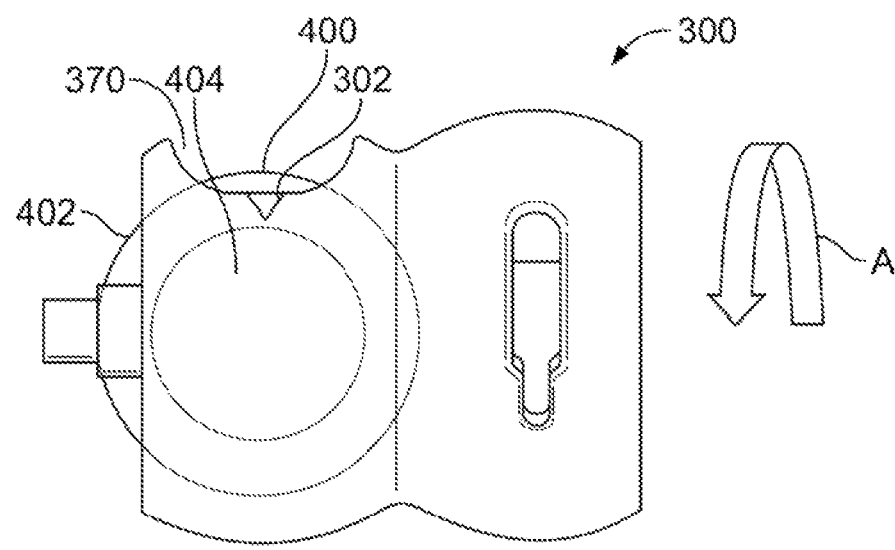
FIG. 9 illustrates a bottom view of a fluid-metering valve assembly in a closed position with respect to a sealing member, according to an embodiment of the present disclosure.

FIG. 9 illustrates a bottom view of the fluid-metering valve assembly 300 in a closed position with respect to a sealing member 400, according to an embodiment of the present disclosure. The sealing member 400 may be an example of a sealing member as described above with respect to FIG. 2. The sealing member 400 includes an outer sealing ring 402 that extends about an opening 404. As shown in FIG. 9, in the closed position, the metering member 302 is not in communication with the opening 404. As such, fluid may not pass from the metering member 302 into the opening 404. In order to meter fluid from the metering member 302 into the opening 404, the fluid-metering valve assembly 300 is rotated with respect to the sealing member 400 in the direction of arc A.

Figure 10:
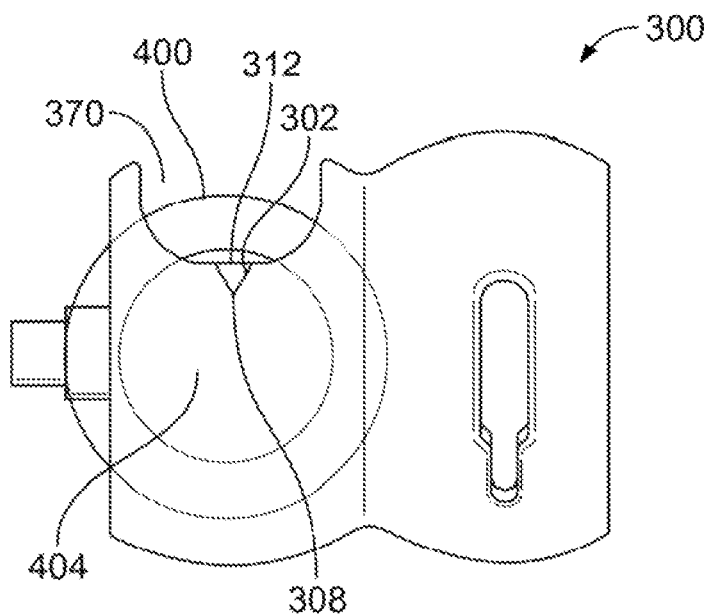
FIG. 10 illustrates a bottom view of a fluid-metering valve assembly in a metering open position, according to an embodiment of the present disclosure.

FIG. 10 illustrates a bottom view of the fluid-metering valve assembly 300 in a metering open position, according to an embodiment of the present disclosure. As shown, the metering member 302 is in full fluid communication with the opening 404. As the fluid-metering valve assembly 300 is rotated from the closed position to the metering open position, greater portions of the metering member 302 fluidly communicate with the opening 404. As greater portions of the metering member 302 fluidly communicate with the opening 404, greater amounts of fluid pass through the metering member 302 into the opening 404. For example, when only the constricted fluid outlet apex 308 is in fluid communication with the opening 404, a small, metered amount of fluid passes into the opening 404. If increased flow is desired, the fluid-metering valve assembly 300 is rotated in the direction of arc A (shown in FIG. 9) so that greater portions of the metering member 302 fluidly communicate with the opening 404.

In order to provide maximum metered flow, the fluid-metering valve assembly 300 is rotated such that the fluid inlet 312 of the metering member 302 is in fluid communication with the opening 404. Therefore, minimum or otherwise reduced metered flow is achieved when the fluid outlet apex 308, or constricted end, of the metering member 302 is in fluid communication with the opening 404; while maximum metered flow is achieved when the fluid inlet 312, or fluid-receiving mouth, is in fluid communication with the opening 404. The fluid-metering valve assembly 300 may be rotated between the minimum and maximum flow positions in order to fine tune metered flow with respect to the opening 404.

The fluid-metering valve assembly 300 may continue to be rotated in the direction of arc A (shown in FIG. 9) so that a fluid passage channel 370 is in fluid communication with the opening 404. When the fluid passage channel 370 is in fluid communication with the opening 404, the flow of fluid may be unrestricted (as opposed to metered flow, when only portions of the metering member 302 are in communication with the opening 404).

Figure 11:
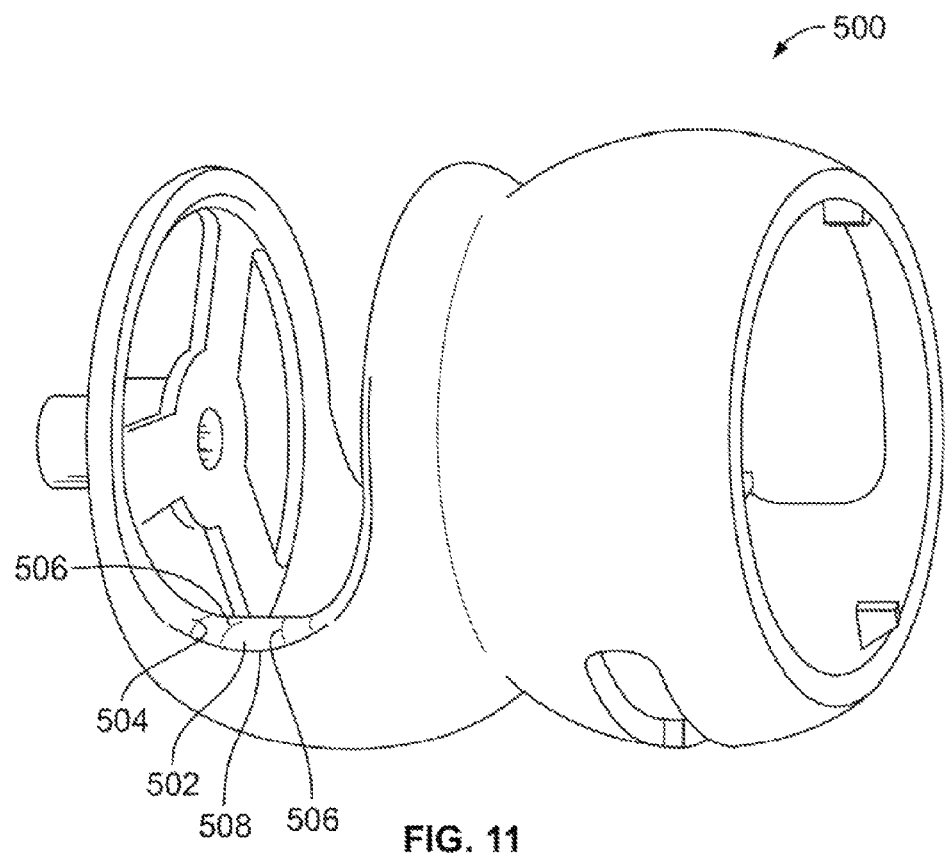
FIG. 11 illustrates a perspective view of a fluid-metering valve assembly, according to an embodiment of the present disclosure.
Figure 12:
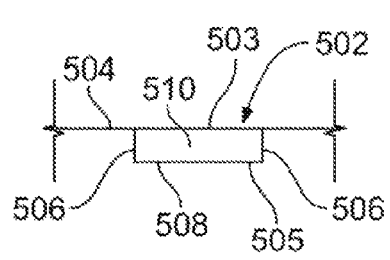
FIG. 12 illustrates a front view of a metering member formed at a metering edge of a fluid-metering valve assembly, according to an embodiment of the present disclosure.

FIG. 11 illustrates a perspective view of a fluid-metering valve assembly 500, according to an embodiment of the present disclosure. FIG. 12 illustrates a front view of a metering member 502 formed at a metering edge 504 of the fluid-metering valve assembly 500. Referring to FIGS. 11 and 12, the fluid-metering valve assembly 500 is similar to those described above, except that the metering member 502 includes a fluid inlet 503 that connects to a fluid outlet 505 that is generally the same width as the inlet 502. Linear side walls 506 connect to a rear wall 508. The side walls 506 may be perpendicular to the rear wall 508. The metering member 502 may be defined between the side walls 506, the rear wall 508, and a base 510, as described above. As such, the metering member 502 may resemble a rectangular shape. Alternatively, the metering member 502 may not include the base 510, but may instead include a channel or perforation formed through the metering edge 504.

Figure 14:
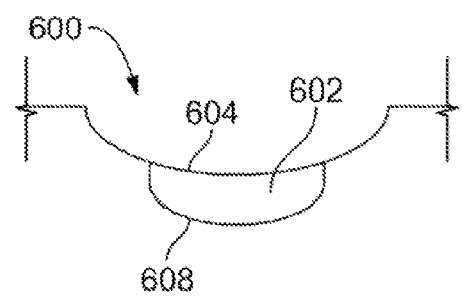
FIG. 14 illustrates a front view of a metering member formed at a metering edge of a fluid-metering valve assembly, according to an embodiment of the present disclosure.
Figure 13:
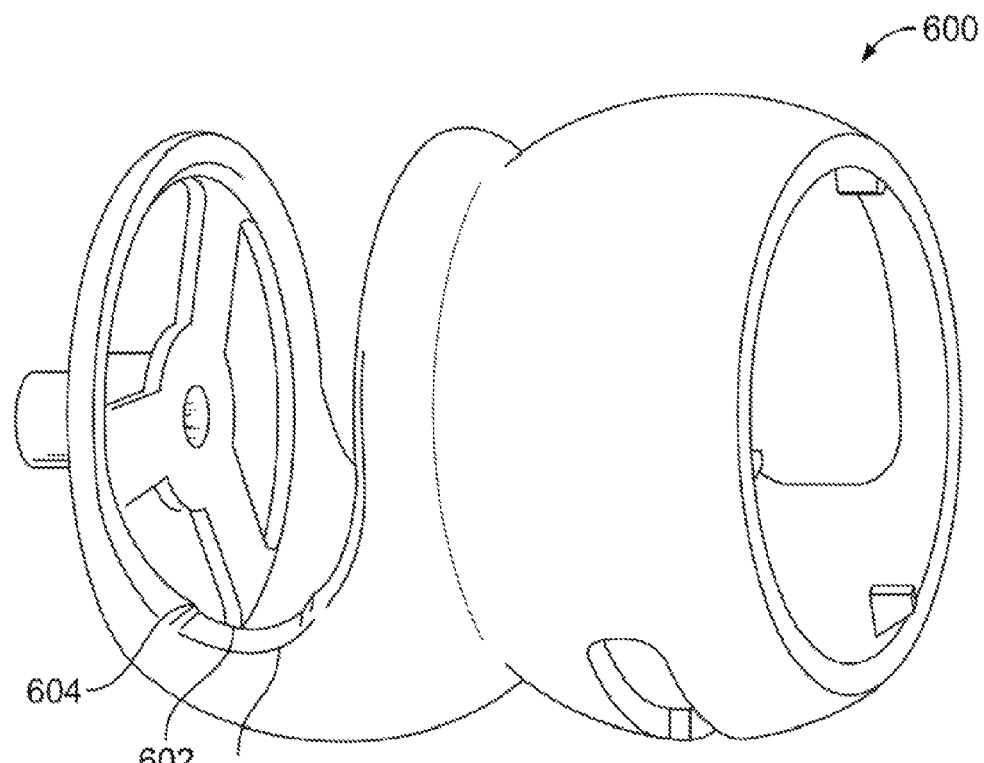
FIG. 13 illustrates a perspective view of a fluid-metering valve assembly, according to an embodiment of the present disclosure.

FIG. 13 illustrates a perspective view of a fluid-metering valve assembly 600, according to an embodiment of the present disclosure. FIG. 14 illustrates a front view of a metering member 602 formed at a metering edge 604 of the fluid-metering valve assembly 600. Referring to FIGS. 13 and 14, the fluid-metering valve assembly 600 is similar to the fluid-metering valve assembly 500, except that the metering edge 604 may be curved and arcuate, and a rear wall 608 of the metering member 602 may be parallel to the metering edge 604. With increased rotation towards an open metering position, greater portions of the curved rear wall 608 align with a fluid opening or passage, thereby allowing greater volumes of fluid to pass into the fluid opening or passage.

Figure 15:
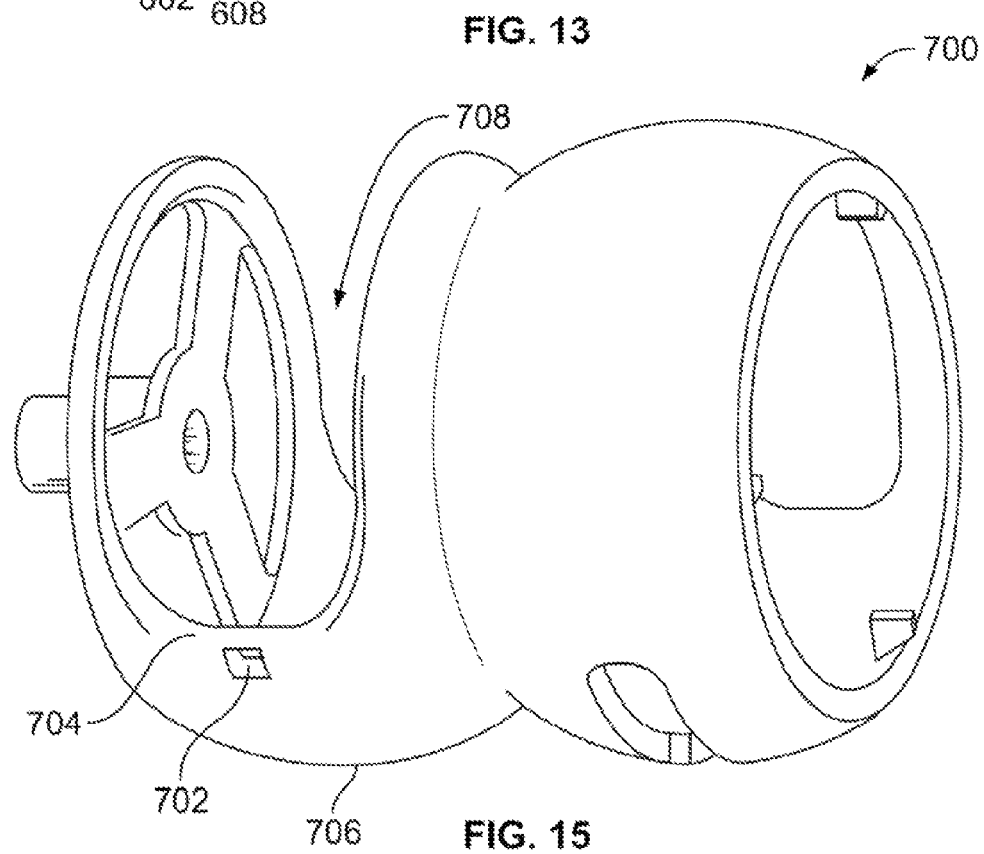
FIG. 15 illustrates a perspective view of a fluid-metering valve assembly, according to an embodiment of the present disclosure.

FIG. 15 illustrates a perspective view of a fluid-metering valve assembly 700, according to an embodiment of the present disclosure. The fluid-metering valve assembly 700 includes a metering member 702 that is offset, such as being set below, a metering edge 704. As such, the metering member 702 may be formed through a circumferential wall 706, and may not connect to an edge defining a fluid passage channel 708. As shown in FIG. 15, the metering member 702 may be a square-shaped hole formed through the circumferential wall 706 proximate, but not connecting, to the metering edge 704. Alternatively, the metering member 702 may be various other shapes, such as triangular, or any of the shapes described above, for example.

Referring to FIGS. 1-15, embodiments of the present disclosure provide fluid-metering valve assemblies configured to provide increased temperature control of internal combustion engine cooling systems. Embodiments of the present disclosure provide valves assemblies that allow small doses of cold coolant to be metered into the system through rotations of the assemblies.

Embodiments of the present disclosure provide metering members, such as recesses, divots, geometric features, or the like, that allow for a calculated volume of fluid to be introduced to a thermal control system to avoid large volumes of fluid being introduced therein.

Embodiments of the present disclosure provide metering members that are smaller and simpler than known designs. Embodiments of the present disclosure provide metering members that may include straight or linear geometric features that are generally easier to form and manufacture than complex, curved cuts and the like.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

Various features of the disclosure are set forth in the following claims.

The invention claimed is:

1. A fluid-metering valve assembly configured for use in a coolant regulator of an internal combustion engine cooling system, the fluid-metering valve assembly comprising:
   a main body configured to be rotatably secured within an internal chamber of the coolant regulator, wherein a fluid passage is formed through the main body, wherein the fluid passage is defined, at least in part, by a metering edge of the main body; and
   a metering member formed at the metering edge of the main body, wherein the metering member does not pass entirely through the metering edge, wherein the metering member is configured to allow variable doses of fluid to be metered into or out of the coolant regulator as the main body is rotated within the coolant regulator, and wherein the metering member includes one or more linear features formed into the main body.

2. The fluid-metering valve assembly of claim 1, wherein the metering member includes a fluid inlet connected to a constricting fluid outlet, wherein the fluid inlet includes a fluid inlet opening defined between linear side walls and a perpendicular base, wherein the linear side walls connect to linear barrier inlet walls that are parallel to the metering edge, and wherein the linear barrier inlet walls connect to linear angled outlet walls of the constricting fluid outlet.

3. The fluid-metering valve assembly of claim 2, wherein the linear angled outlet walls converge toward a linear barrier outlet wall that is parallel with the metering edge.

4. The fluid-metering valve assembly of claim 1, wherein the metering member is T-shaped.

5. The fluid-metering valve assembly of claim 1, wherein the metering member slopes from a fluid inlet to a fluid outlet, wherein a first depth of the metering member at the fluid inlet is greater than a second depth of the metering member at the fluid outlet.

6. The fluid-metering valve assembly of claim 1, wherein the metering member comprises angled side walls that converge at a fluid outlet apex, and wherein the metering member forms a semi-funnel.

7. The fluid-metering valve assembly of claim 1, wherein the metering member includes a fluid inlet that connects to a fluid outlet having the same width as the fluid inlet.

8. The fluid-metering valve assembly of claim 1, wherein the metering edge is curved, and wherein at least one wall portion of the metering member is parallel to the curved metering edge.

9. The fluid-metering valve assembly of claim 1, wherein the metering member includes only one or more linear features formed on an outer surface and into the main body.

10. An internal combustion engine cooling system, comprising:
    a coolant regulator having an internal chamber;
    an actuator; and
    a fluid-metering valve assembly rotatably secured within the internal chamber and operatively connected to the actuator, wherein the actuator is configured to rotate the fluid metering valve assembly within the internal chamber, the fluid-metering valve assembly comprising:
       a main body rotatably secured within the internal chamber and having a drive shaft operatively connected to the actuator, wherein a fluid passage is formed through the main body, wherein the fluid passage is defined, at least in part, by a metering edge of the main body; and
       a metering member formed at the metering edge of the main body, wherein the metering member does not pass entirely through the metering edge, wherein the metering member is configured to allow variable doses of fluid to be metered into or out of the coolant regulator as the main body is rotated within the coolant regulator, and wherein the metering member includes one or more linear features formed into the main body.

11. The internal combustion engine cooling system of claim 10, wherein the metering member includes a fluid inlet connected to a constricting fluid outlet, wherein the fluid inlet includes a fluid inlet opening defined between linear side walls and a perpendicular base, wherein the linear side walls connect to linear barrier inlet walls that are parallel to the metering edge, wherein the linear barrier inlet walls connect to linear angled outlet walls of the constricting fluid outlet, and wherein the linear angled outlet walls converge toward a linear barrier outlet wall that is parallel with the metering edge.

12. The internal combustion engine cooling system of claim 10, wherein the metering member slopes from a fluid inlet to a fluid outlet, wherein a first depth of the metering member at the fluid inlet is greater than a second depth of the metering member at the fluid outlet.

13. The internal combustion engine cooling system of claim 10, wherein the metering member comprises angled side walls that converge at a fluid outlet apex, and wherein the metering member forms a semi-funnel.

14. The internal combustion engine cooling system of claim 10, wherein the metering member includes a fluid inlet that connects to a fluid outlet having the same width as the fluid inlet.

15. The internal combustion engine cooling system of claim 10, wherein the metering edge is curved, and wherein at least one wall portion of the metering member is parallel to the curved metering edge.

16. The internal combustion engine cooling system of claim 10, wherein the metering member includes only one or more linear features formed on an outer surface and into the main body.

* * * * *